April 21, 1942.   D. M. WRIGHT   2,280,209
CLASSIFYING RAKE
Filed Sept. 22, 1939   2 Sheets-Sheet 1

David M. Wright
INVENTOR

ATTEST
BY
ATTORNEY

April 21, 1942.     D. M. WRIGHT     2,280,209
CLASSIFYING RAKE
Filed Sept. 22, 1939     2 Sheets-Sheet 2
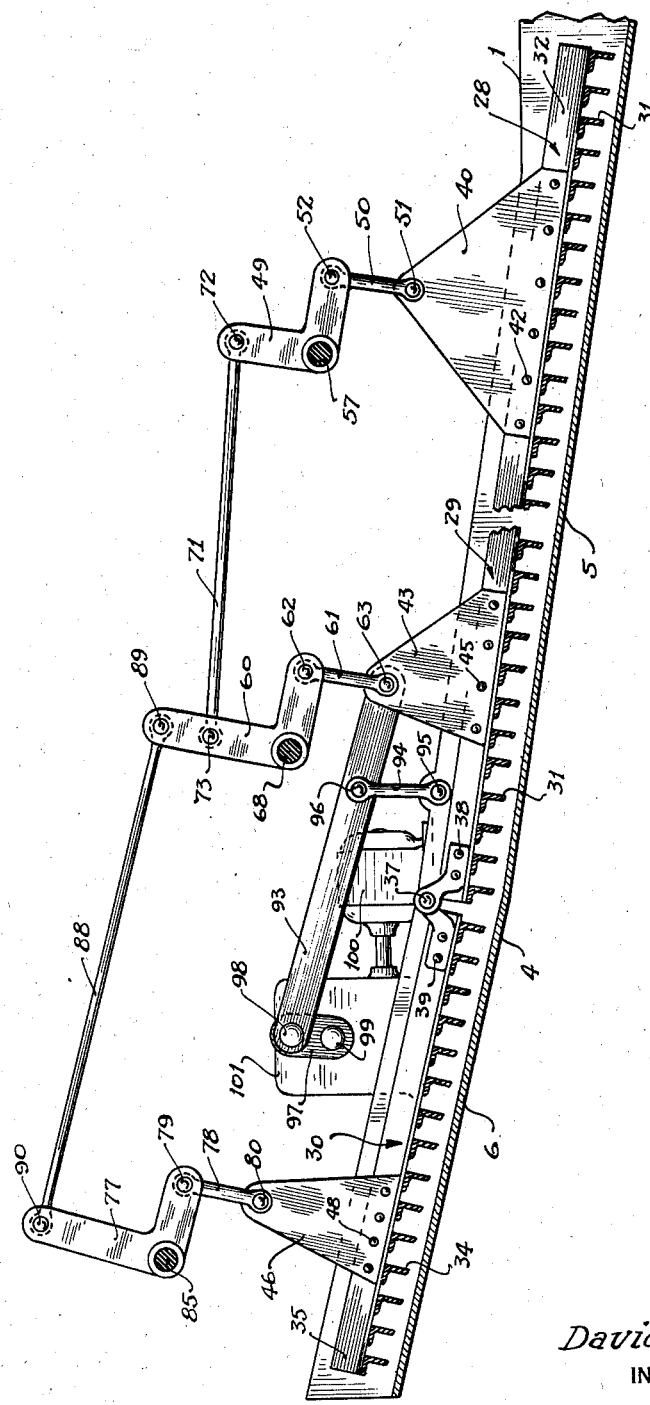
Fig. 3
David M. Wright
INVENTOR
BY 
ATTORNEY Patented Apr. 21, 1942

2,280,209

UNITED STATES PATENT OFFICE 2,280,209

CLASSIFYING RAKE

David M. Wright, Agricola, Fla., assignor to Industrial Patents Corporation, Chicago, Ill., a corporation of Delaware Application September 22, 1939, Serial No. 296,155

3 Claims. (Cl. 209—462)

This invention relates to ore conveyors and classifiers.

One of the objects of the invention is to provide a reciprocal rake classifier comprising a plurality of sections of varying inclinations.

Another object of the invention is to provide improved drainage of classified material.

Another object of the invention is to provide an improved linkage arrangement for operating a sectional classifying rake, the sections of which have different inclinations.

Other objects of the invention will be apparent from the description and claims which follow.

A preferred embodiment of the invention is shown in the accompanying drawings which form a part of this specification in which like reference characters in the several figures designate similar elements.

Figure 3 is a side view partly in section showing the rake and linkage mechanism of the device shown in Figures 1 and 2.

Figure 1:
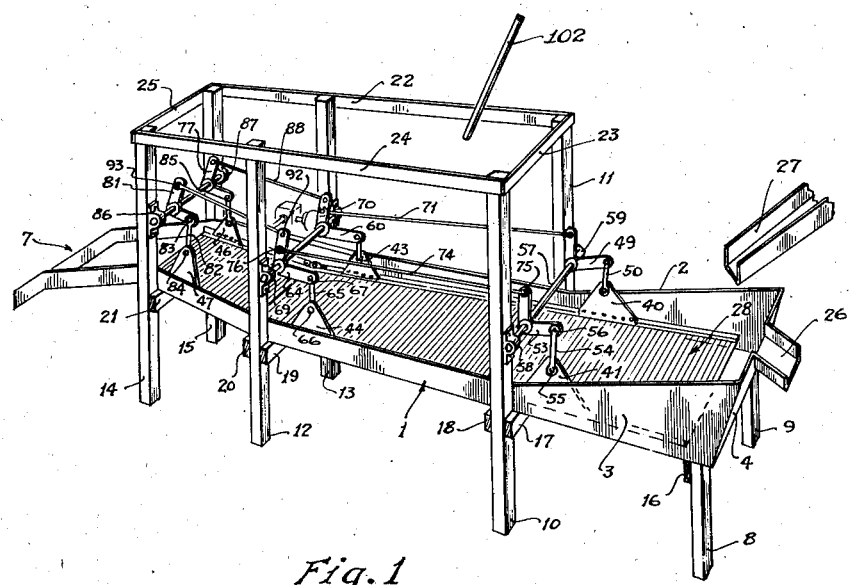
Figure 1 is a perspective view of a classifying rake device constructed in accordance with the present invention.
Figure 2:
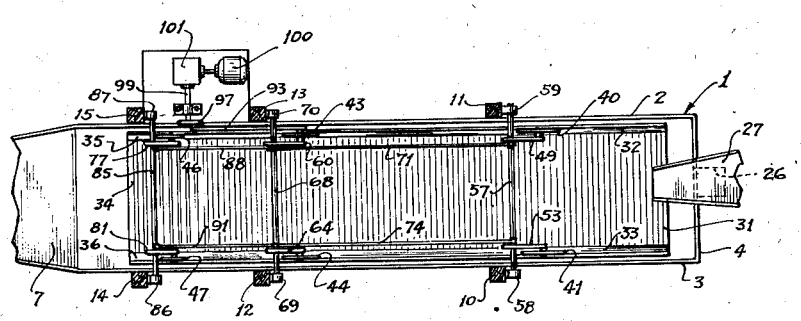
Figure 2 is a plan view of the device shown in Figure 1.

The device consists of a trough 1 with sides 2 and 3, lower end 4 and a bottom which consists of two sections 5, which is comparatively long and flat, and 6 at the upper end thereof which is comparatively short and has a much greater inclination than section 5. In the preferred embodiment of this device the trough 1 has no partition at the upper end thereof, the sloping floor 6 merging into the discharge trough 7. The trough may be supported by any suitable means such as uprights 8, 9, 10, 11, 12, 13, 14 and 15 and cross braces 16, 17, 18, 19, 20 and 21. Preferably the uprights would be braced above the trough by pieces 22, 23, 24 and 25. At the lower end 4 of trough 1 is a spillway 26 for the removal of water carrying the finer particles of the material to be classified.

The material to be classified is fed into the device by any suitable means such as charging chute 27 which may be supported in any suitable way not shown.

The rake 28 comprises two sections 29 and 30. Section 29 is slightly shorter than section 5 of the bottom of trough 1 and is adapted to operate along it. Section 30 is of a length comparable to section 6 of bottom 4 of trough 1 and is adapted to operate along that section. Section 29 of rake 28 consists of cross pieces 31 which may be made of ordinary angle iron or other suitable material affixed to side pieces 32 and 33. Similarly, section 30 consists of cross pieces 34 affixed by any suitable method to side pieces 35 and 36. Sections 29 and 30 are hinged together by hinges 37, one end of which is affixed to side pieces 32 as by means of rivets 38 and to side pieces 35 by any suitable means as by rivets 39. A similar hinge between sections 33 and 36 is not shown in the drawings.

Plates 40 and 41 are affixed to side pieces 32 and 33, respectively, near the lower end thereof by any suitable means as by rivets 42. Plates 43 and 44 are affixed to the upper ends of side pieces 32 and 33, respectively, by any suitable means such as rivets 45. Plates 46 and 47 are attached to the upper ends of side pieces 35 and 36 of section 30 by any suitable means such as rivets 48. Plate 40 is attached to bell crank lever 49 by means of link 50 and pins 51 and 52. Plate 41 is linked to bell crank lever 53 by means of link 54 and pins 55 and 56. Bell cranks 49 and 53 are affixed to shaft 57, supported by keepers 58 and 59 attached to uprights 10 and 11. Similarly, plate 43 is linked to bell crank lever 60 by means of link 61 and pins 62 and 63 and plate 44 is linked to bell crank lever 64 by means of link 65 and pins 66 and 67. Bell crank levers 60 and 64 are affixed to shaft 68, which is held in keepers 69 and 70, affixed to uprights 12 and 13. Bell crank lever 49 is attached to bell crank lever 60 by means of link 71 and pins 72 and 73. Similarly, bell crank lever 53 is linked to bell crank lever 64 by means of link 74 and pins 75 and 76. Plate 46 is linked to bell crank lever 77 by means of link 78 and pins 79 and 80. Plate 47 is linked to bell crank lever 81 by means of link 82 and pins 83 and 84. Bell crank levers 77 and 81 are affixed to shaft 85 held in keepers 86 and 87, affixed to uprights 14 and 15. Bell crank lever 77 is linked to bell crank lever 60 by means of link 88 and pins 89 and 90, and similarly, bell crank lever 81 is linked to bell crank lever 64 by means of link 91 and pins 92 and 93. Attached to plate 43 by means of pin 63 is lever arm 93 pivoted on bar 94, which is movably affixed to side 2 of trough 1 by means of pin 95 and to lever arm 93 by means of pin 96. The free end of lever arm 93 is affixed to crank 97 by means of crank pin 98. Crank 97 is rigidly affixed to rotatable shaft 99 by any suitable means. The entire device is driven by motor 100 operating through suitable gears 101, not shown in detail, which rotate shaft 99. In order to secure better classification of material it is sometimes desirable to spray water through spray 102 from a source of supply not shown upon the upper end of section 29 intermediate between the water level in trough 1 and section 30 of rake 28.

The device herein described relates to a rake classifier comprising a trough having a bottom with a relatively long and substantially flat section at the upper or discharge end thereof a relatively short section with a greater slope than the first section, a classifying rake comprising a relatively long rake of the usual type hinged to to the upper end of which is a shorter rake of the same type, the whole of said rake adapted to operate along the bottom of said trough, and means for moving said rake upwardly along bottom of said trough, raising said rake with relation to bottom of said trough and returning the rake in the raised position to the extent of its backward position and lowering said rake to the bottom of said trough. The movement herein described is secured by means of the linkage shown in the present invention or its equivalent.

The advantages of this invention reside in the fact that in that part of the classifier which is below the surface of the liquid or is subjected to the spray, a deep slope would result in too much of the material being washed away. Therefore, the slope in this portion of the trough and rake should be comparatively flat. In order to drain the material before its discharge, it is advisable to have a considerably sharper slope at the discharge end.

The present invention provides a most simple arrangement for imparting reversible lateral movement to such a sectional rake classifier and for raising and lowering the classifier at the extremes of its longitudinal movement and embodying the principal of the two distinct inclinations of the rake.

I claim:

1. A classifier comprising a trough having a bottom with a relatively long substantially flat section and at the upper end of said trough a relatively short section with a greater slope than the first section, a classifying rake with a relatively long substantially flat operating zone, hinged to the upper end of which is a shorter rake, the whole of said rake adapted to operate substantially parallel to and along the bottom of said trough, means for moving said rake substantially parallel to and upwardly along the bottom of said trough, raising said rake with relation to the bottom of said trough, returning the rake in the raised position to the extent of its backward position, and lowering said rake to the bottom of said trough, which last mentioned means comprises bell crank levers mounted at the opposite ends of the more nearly horizontal portion of the classifying rake and at the upper end of the more inclined portion of the rake, links connecting said bell crank levers with said rake and with each other, a rotatable shaft, a crank means rigidly secured to said shaft and a lever connecting said crank means with the bell cranks, means for feeding the material to be classified into the lower end of said trough, and means for removal of classified material.

2. A classifier comprising a trough having a working section and a discharge end section of greater upward slope than the working section, a rigid rake element cooperating with said working section, and another rigid rake element cooperating with said discharge section, said rigid rake elements being hingedly secured together, means to support and drive said hinged rake so that both its outer ends travel forwardly in a path substantially parallel to the section over which the end moves and the hinged portion is guided to travel in a predetermined path whereby the angle between the two rake elements varies during a cycle of operation, said drive means having mechanism to return said rake elements to their initial position after the forward travel has been completed, said mechanism including means to raise said elements away from the trough during such return movement and to lower said elements into the cooperative relation upon reaching the initial position.

3. A classifier comprising a trough having a classifying section and a discharge end section of greater upward slope than the classifying section, a rake element cooperating with said classifying section, and another rake element cooperating with said discharge section, said rake elements being hingedly secured together, means to support said hinged rake elements in suspended relation to the trough, drive means pivoted to a side of said trough for moving said rake elements so that the outer ends thereof travel forwardly in a path substantially parallel to the section over which the ends move and the hinged portion is guided to travel in a controlled path whereby the angle between the two rake elements varies during such travel, said drive means having a cranking mechanism adapted to return said rake elements to their initial position after the forward travel has been completed including means to raise said elements away from the trough during such return movement and to lower said elements into the cooperative relation upon reaching the initial position.

DAVID M. WRIGHT.